(12) United States Patent
Winkler

(10) Patent No.: US 7,971,760 B1
(45) Date of Patent: Jul. 5, 2011

(54) DIVOT MIX DISPENSER

(75) Inventor: David R. Winkler, Wildwood, MO (US)

(73) Assignee: JSJS Industries, LLC

(*) Notice: Subject to any disclaimer, the term of this patent is extended or adjusted under 35 U.S.C. 154(b) by 517 days.

(21) Appl. No.: 11/948,483

(22) Filed: Nov. 30, 2007

Related U.S. Application Data

(60) Provisional application No. 60/868,215, filed on Dec. 1, 2006.

(51) Int. Cl.
*A47G 19/14* (2006.01)
*B65D 21/02* (2006.01)
*B65D 5/72* (2006.01)
*B65D 39/08* (2006.01)

(52) U.S. Cl. ............... 222/465.1; 222/183; 222/180; 222/566; 215/329; 215/357; 220/23.87; 220/23.91; 220/296

(58) Field of Classification Search ............ 222/154, 222/156, 157, 158, 159, 465.1, 468, 460, 222/180, 183, 173, 478, 481, 565, 566, 572; 206/514; 215/10, 307, 276, 272, 314, 329, 215/357; 220/23.89, 23.87, 23.83, 23.86, 220/23.91, 296, 366.1, 303, 298, 737; 141/319, 141/124, 273
See application file for complete search history.

(56) References Cited

U.S. PATENT DOCUMENTS

| 1,563,112 | A | * | 11/1925 | Slate | 220/240 |
| 1,949,357 | A | * | 2/1934 | Cross | 222/424.5 |
| 2,989,203 | A | * | 6/1961 | Bramming | 215/12.1 |
| 4,172,485 | A | * | 10/1979 | Mathieu | 206/316.2 |
| 6,234,338 | B1 | * | 5/2001 | Searle | 220/366.1 |
| 6,739,486 | B2 | * | 5/2004 | Winkler | 222/608 |
| 7,163,125 | B2 | * | 1/2007 | Murakami et al. | 222/51 |
| 7,216,785 | B1 | * | 5/2007 | Meyer et al. | 222/568 |
| 7,490,805 | B2 | * | 2/2009 | Krall | 248/311.2 |
| 2002/0033402 | A1 | * | 3/2002 | Winkler | 222/465.1 |
| 2002/0037779 | A1 | * | 3/2002 | Meyer et al. | 473/408 |
| 2002/0056728 | A1 | * | 5/2002 | Winkler | 222/175 |
| 2002/0109062 | A1 | * | 8/2002 | Fowler | 248/311.2 |
| 2005/0224539 | A1 | * | 10/2005 | Hardy et al. | 224/274 |

* cited by examiner

*Primary Examiner* — Kevin P Shaver
*Assistant Examiner* — Stephanie E Williams
(74) *Attorney, Agent, or Firm* — Grace J. Fishel

(57) ABSTRACT

A divot mix dispenser having an annular body sized to mate with a holder mounted to a golf cart. The body includes a spout located at the upper end of the body with the spout having an opening offset from a centerline of the container through which the divot mix flows out of the dispenser. The lower end of the body defines an inlet for removable attachment with a cap so that the cap can be removed to fill the dispenser with divot mix and attached to secure the divot mix within the dispenser.

7 Claims, 6 Drawing Sheets

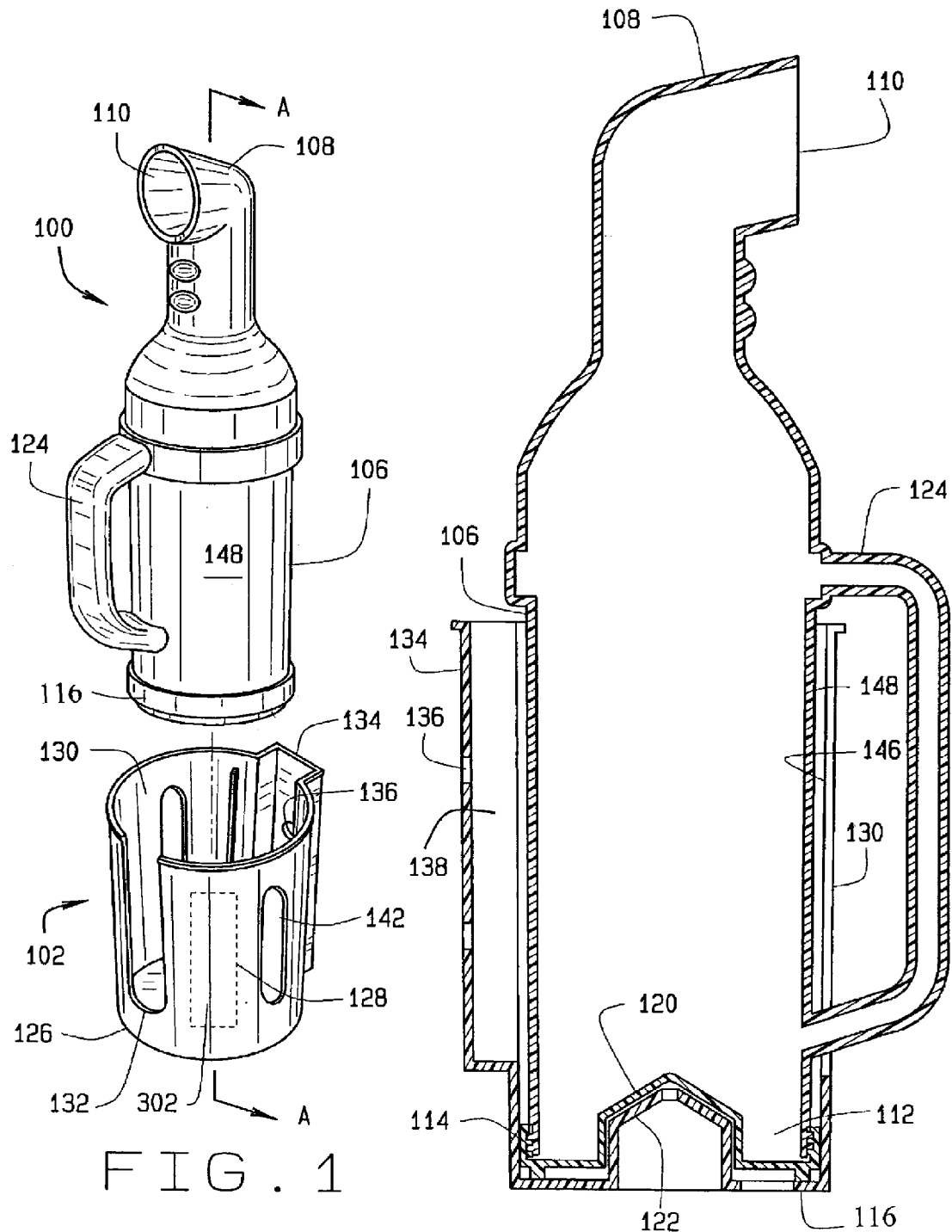

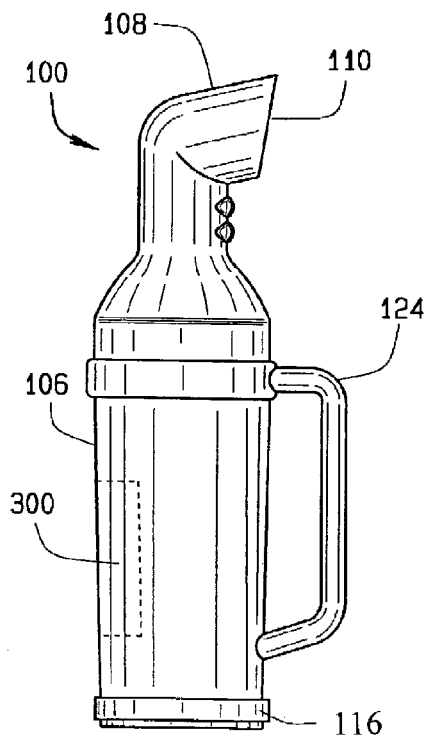
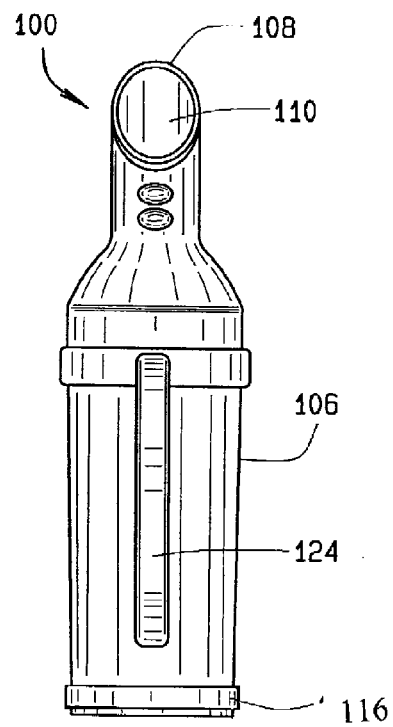
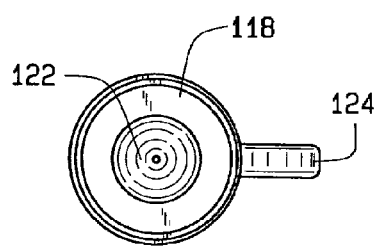
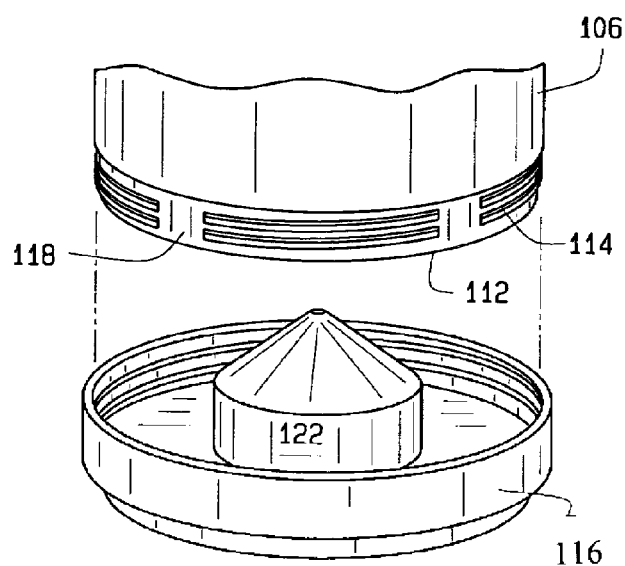
FIG. 3
FIG. 4
FIG. 5
FIG. 6

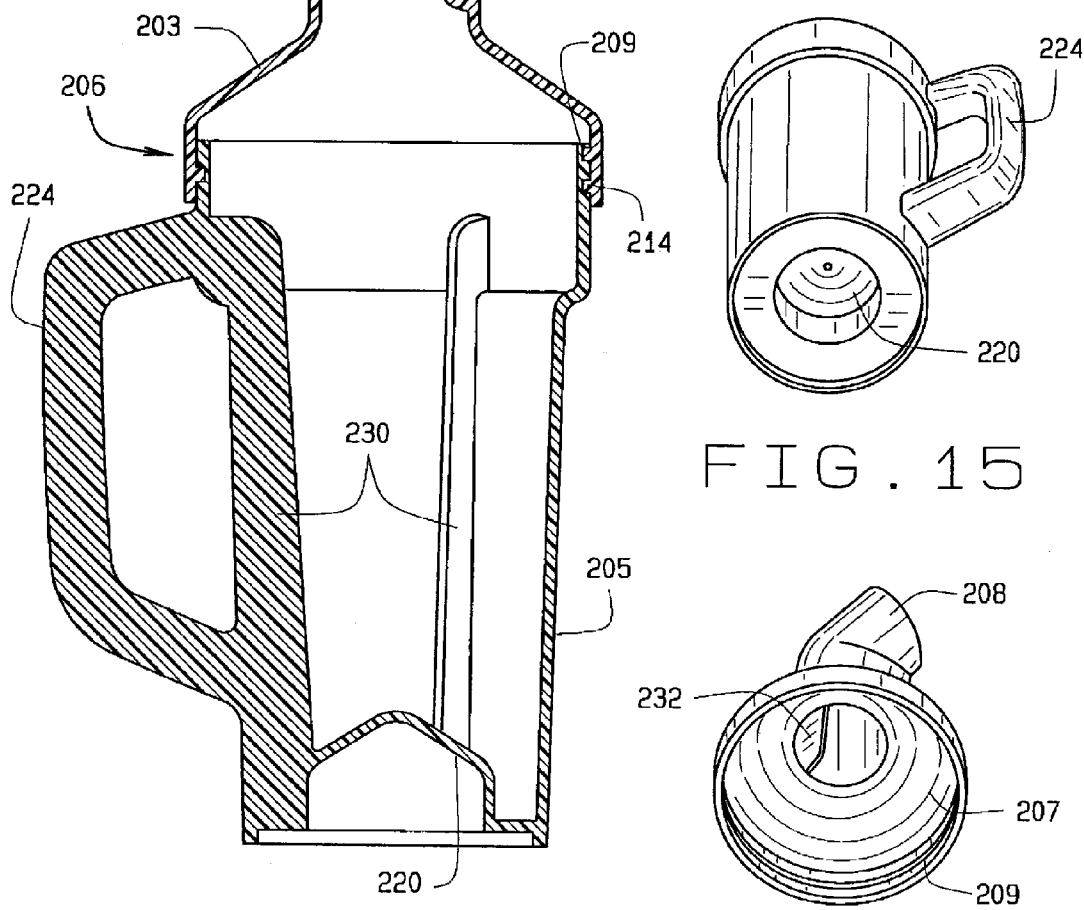
FIG. 13
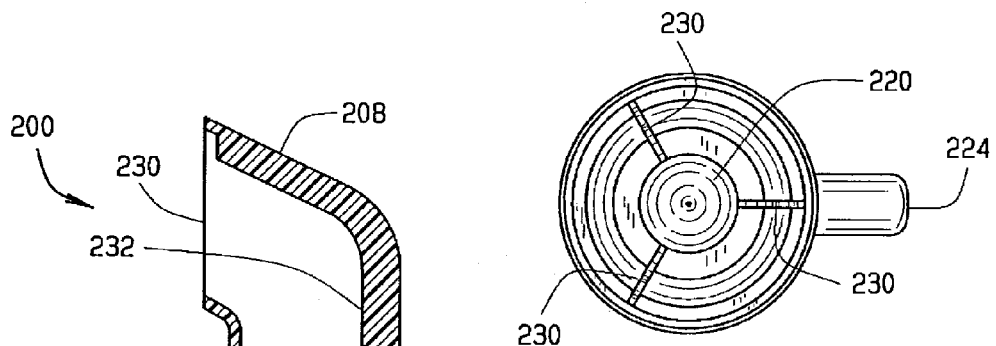
FIG. 14
FIG. 15
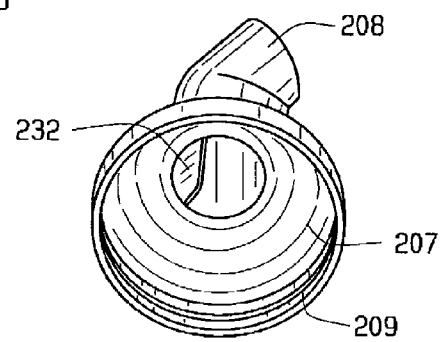
FIG. 16

DIVOT MIX DISPENSER

CROSS-REFERENCE TO RELATED APPLICATIONS

This application is related to U.S. Provisional Patent Application No. 60/868,215 filed Dec. 1, 2006 from which priority is claimed, and is hereby incorporated by reference.

BACKGROUND OF THE INVENTION

On many golf courses, divot mix dispensers are provided to golfers for repairing divot holes. These divot mix dispensers dispense a mixture of sand, soil, fertilizer, grass seed and colorant in selected proportions prepared as appropriate for the golf course grass and soil type to optimally start new grass in the divot hole.

During play, golfers often create a divot in the turf when hitting a golf ball with a golf club. To help maintain the integrity of the golf course, many courses provide golfers with divot mix dispensers to repair divots. The divot mix dispensers dispense a mixture of sand, soil, fertilizer, grass seed, and colorant into the divot to start new grass growth.

Conventional divot mix dispensers are not easily transportable around a golf course. Typically, the dispensers are loosely stored in baskets or other compartments on a golf cart. Therefore, the dispenser tends to roll, bounce, and rattle about as the golf cart travels around the frequently bumpy terrain of the golf course. In addition to being noisy, this can cause the dispenser to spill its contents during transport. In addition, the dispenser is not located in an easily accessible position for use by golfers and refilling by maintenance personnel. Also, the mixtures within the dispensers are susceptible to moisture, which can clump the mixture and prevent it from dispensing properly.

DESCRIPTION OF THE DRAWINGS

In the accompanying drawings which form part of the specification:

FIG. 1 is an exploded perspective view of a divot mix dispenser and a holder;

FIG. 2 is a section view along A-A of FIG. 1 of the divot mix dispenser supported by the holder;

FIG. 3 is a side view of the divot mix dispenser;

FIG. 4 is a front view of the divot mix dispenser;

FIG. 5 is a bottom view of the divot mix dispense;

FIG. 6 is an enlarged perspective view of a bottom portion of the divot mix dispenser with a removable cap removed;

FIG. 13 is a section view along B-B of FIG. 12 of the alternate embodiment of the divot mix dispenser;

FIG. 14 is a top view of a lower portion of the alternate embodiment of the divot mix dispenser;

FIG. 15 is bottom perspective view of the lower portion of the alternate embodiment of the divot mix dispenser; and FIG. 16 is a bottom perspective view of the upper portion of the alternate embodiment of the divot mix dispenser;

Corresponding reference numerals indicate corresponding parts throughout the several figures of the drawings.

DETAILED DESCRIPTION

Figure 7:
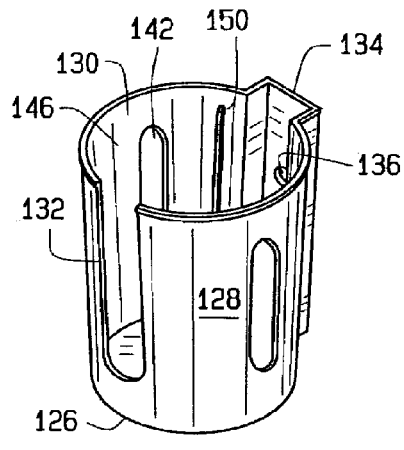
FIG. 7 is a perspective view of the holder.
Figure 8:
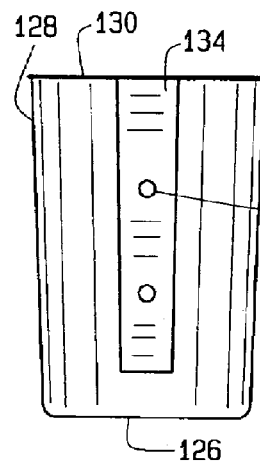
FIG. 8 is a rear view of the holder.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in FIGS. 1-11, an embodiment of the present invention, generally referred to as a divot mix dispenser 100 removeably engages with a holder 102. The holder 102 preferably mounts to a golf cart, such as with a bracket 104, for supporting and transporting the divot mix dispenser 100 (FIGS. 18-21).

The divot mix dispenser 100 includes a generally cylindrical body 106 with a spout 108 extending upwardly from the upper end. The upper portion of the spout 108 angles away from a longitudinal centerline of the container so that an opening 110 of the spout 108 directs outwardly from the dispenser in a generally horizontal direction. When the dispenser 100 lies in a vertically upright position, such as when it rests in the holder 102, the generally horizontal direction of the opening 110 prevents water from rain or sprinklers from directly entering the spout 108. A bottom end of the body 106 defines an inlet 112 with segmented threads 114 around the outer surface that couple with a threaded removable cap 116 (FIGS. 2 and 6). Spaces 118 between the thread segments allow divot mix and other debris to pass between the threads 114 and prevent build up of divot mix on the threads 114, which could otherwise inhibit the coupling of the removable cap 116. The cap 116 can be removed to fill the dispenser 100 with divot mix via the inlet 112. The removable cap 116 includes a generally annular indentation 120 that mates with a corresponding generally annular protrusion 122 on the holder 102 to reduce unwanted movement of dispenser 100 within the holder 102 while the golf cart is in motion, such as shaking or rattling (FIG. 2). Those skilled in the art will recognize that the indentation and corresponding protrusion can be an shape that allows the dispenser 100 to mate with the holder 102, such as oval, square, rectangular, star-shaped, and the like.

The divot mix dispenser 100 also includes a handle 124 extending along the body 14. The handle 124 can be either hollow (FIG. 2) or solid (FIG. 13). With the removable cap 116 removed, a user engages the handle 124 and uses the dispenser 100 as a scoop to fill the dispenser 100 with divot mix through the inlet 112. Although FIGS. 1-16 show the handle 124 with both ends attached to the body 106, those skilled in the art will recognize that either end of the handle 124 can be detached from the body 106.

Figure 9:
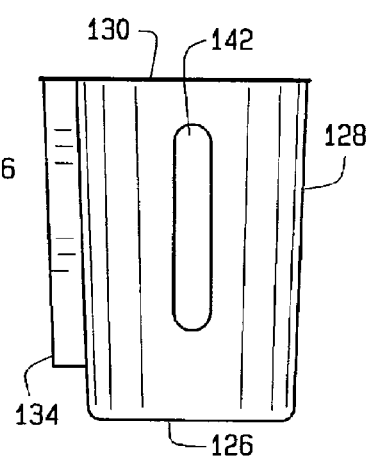
FIG. 9 is a side view of the holder.
Figure 10:
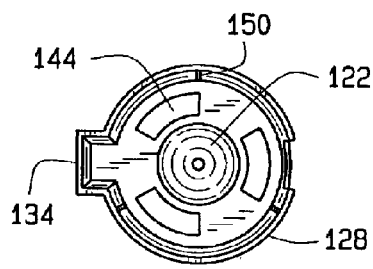
FIG. 10 is a top view of the holder.
Figure 11:
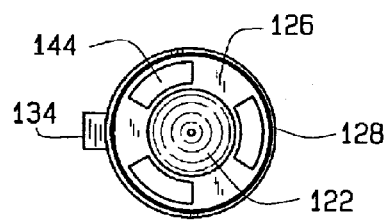
FIG. 11 is a bottom view of the holder.
Figure 12:
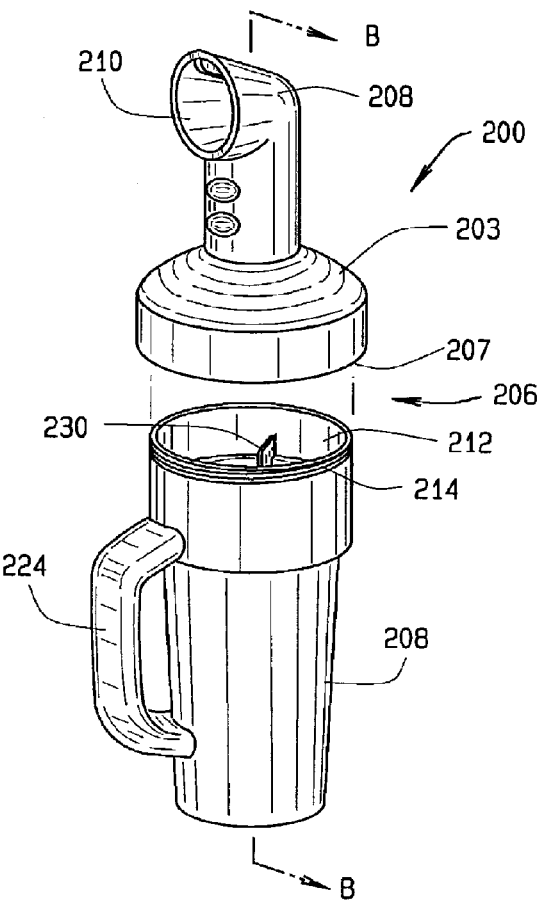
FIG. 12 is an exploded perspective view of an alternate embodiment of the divot mix dispenser.

The holder 102 includes a base 126 with a cylindrical sidewall 128 extending upwardly from the base 126 to define an open top 130 (FIGS. 7-10). The sidewall 128 defines a slot 132 for receiving the dispenser handle 124 and a generally vertical raised spine 134 with mounting holes 136 for attaching the holder 102 to a golf cart with the bracket 104 (FIGS. 18-21). The raised spine 134 defines an interior space 138 for receiving fasteners 160 of the bracket 104. At least one viewing slot 142 is located along the sidewall 128 that allows the user to see the level of divot mix material within the dispenser 100 without removing the dispenser 100 from the holder 102 (FIGS. 7 and 9).

The protrusion 122 extends upwardly from the base 126 for mating with the indentation 120 of the removable cap 116. The base 126 also includes arcuate apertures 144 about the protrusion 122 that allow water and debris, such as divot mix, to pass through the holder 102. An inner surface 146 of the sidewall 128 corresponds to a portion of the exterior surface 148 of the dispenser 100 so as to have a sliding fit between them. Elongated rib members 150 align vertically along the inner surface 146 of the sidewall 128 in a generally equidistant arrangement to engage the exterior surface 148 of the dispenser 100. The rib members 150 engage the exterior surface 148 of the dispenser 100 to define spaces 152 between the exterior surface 148 and the interior surface 146 that are generally aligned in communication with the apertures 144. This directs any dirt or sand dislodged from exterior surface 148 of the dispenser 100 into the spaces 152 and into the apertures 144. The dispenser 100 slides into the holder 102 through the open top 130 until the indentation 120 couples with the protrusion 122 and rests on the base 126. Together, the engagement of the rib members 150 and the coupling of the protrusion 122 and indentation 120 reduce unwanted movement of dispenser 100 within the holder 102 while the golf cart is in motion, such as shaking or rattling.

Figure 17:
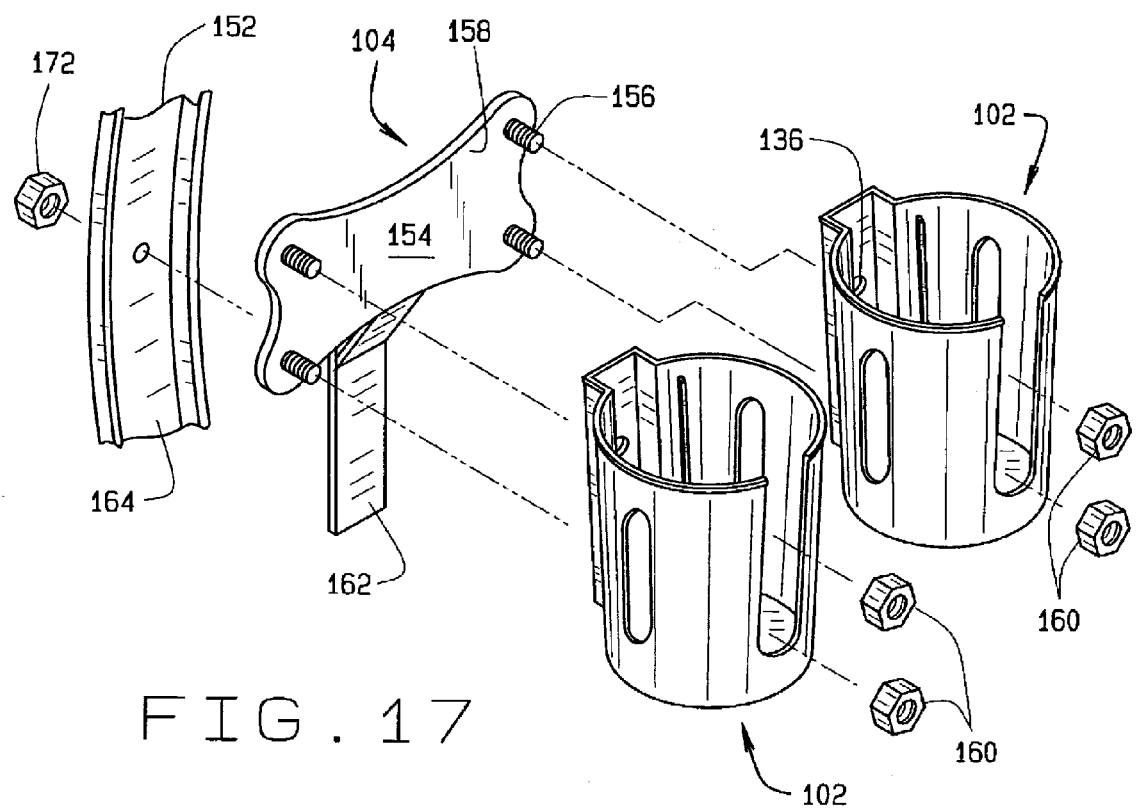
FIG. 17 is an exploded perspective view of a pair of holders mounted to a golf cart upright with a bracket.
Figure 18:
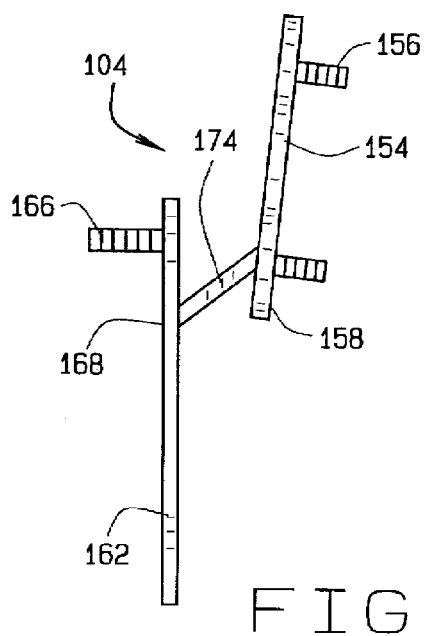
FIG. 18 is a side view of the bracket of FIG. 17.

In FIG. 17, the bracket 104 can mount a pair of holders 102 to a golf cart upright 152. The bracket 104 includes a generally rectangular attachment plate 154 having fasteners 156, such as bolts or studs, extending from the front face 158 for coupling with the mounting holes 136 along the raised spine 134 of the holders 102. Nuts 160 couple with the fasteners 156 to secure the holders 102 to the attachment plate 154. The bracket 104 also includes an elongate mounting plate 162 sized to fit within a slot 164 of the golf upright 152. A fastener 166, such as a bolt or stub, extends from the rear face 168 of the mounting plate 162 to couple with a mounting hole 170 of the upright using a nut 172. A brace 174 connects between the mounting plate 162 and attachment plate 154 with the attachment plate 154 being positioned slightly offset from vertical. This position slants the open tops 130 of the holders 102 outwardly to allow for easier removal of the dispenser 100 by the user.

Figure 19:
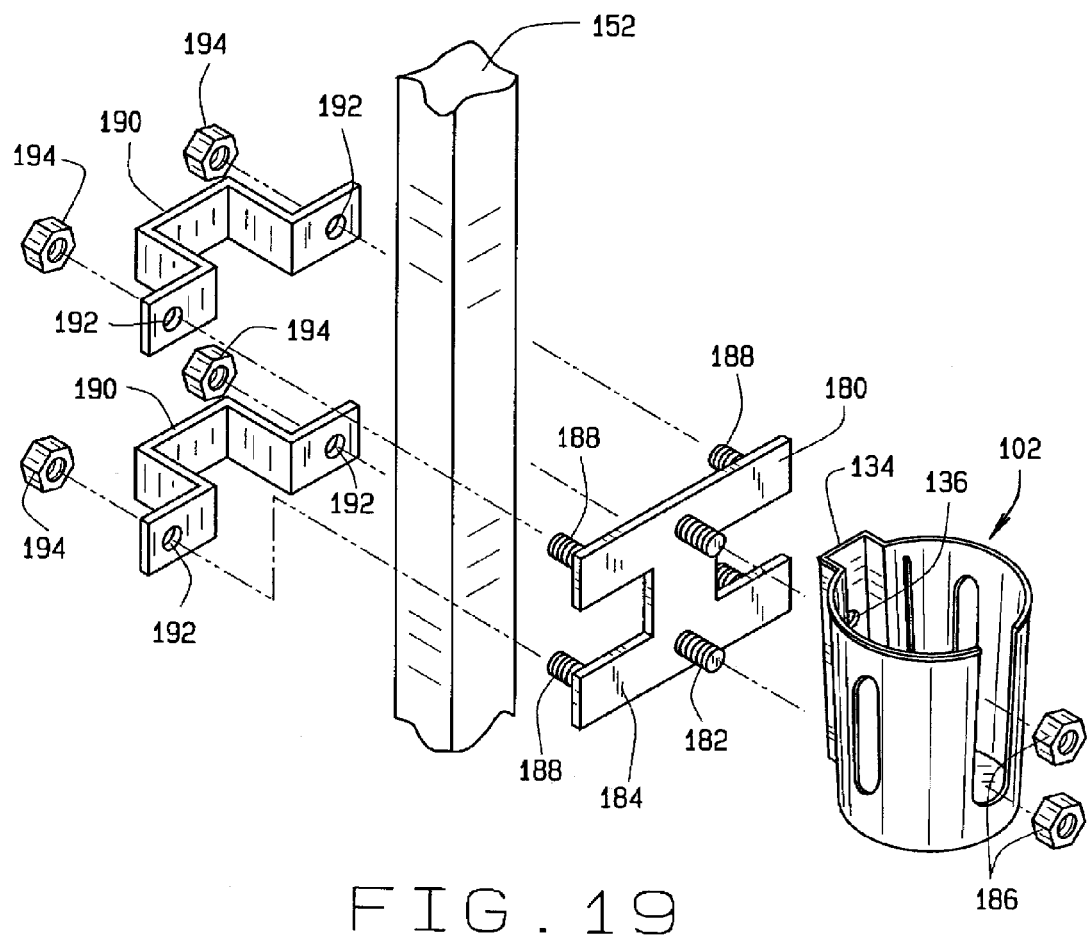
FIG. 19 is an exploded perspective view of an alternate embodiment of a holder mounted to a golf cart upright with a bracket.
Figure 20:
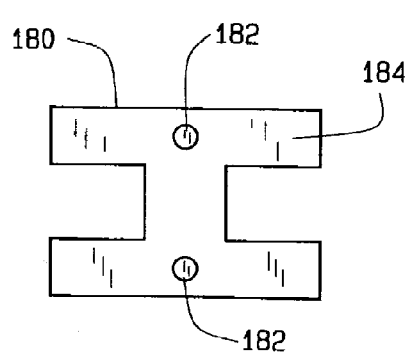
FIG. 20 is a front view of the of the alternate embodiment of the holder of FIG. 19.
Figure 21:
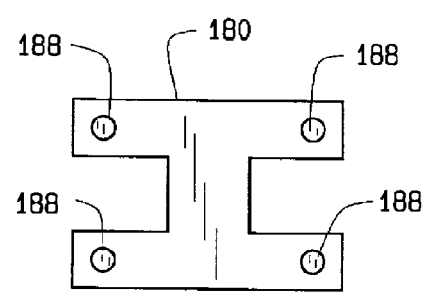
FIG. 21 is a rear view of the alternate embodiment of the holder of FIG. 19.

FIGS. 19-21 illustrate an alternate embodiment of the bracket 180, which can be used to mount a single holder 102 to a golf upright 152. The bracket 180 is a generally H-shaped plate having a pair of fasteners 182, such as bolts or studs, extending from a front face 184 for coupling with the mounting holes 136 along the raised spine 134 of the holder 102. Nuts 186 couple with the fasteners 182 to secure the holder 102 to the bracket 180. Two pair of fasteners 188 extend from the rear face of the bracket 180 for coupling with a pair of upright brackets 190. The upright brackets 190 are generally U-shaped channels sized to receive the golf upright 152 and include holes 192 on opposite ends that align with the fasteners 188. Nuts 194 couple with the fasteners 188 to secure the upright brackets 190 and bracket 180 to the golf upright 152.

In operation, a user removes the cap 116 from the dispenser 100 and fills it with divot mixture. Once filled, the cap 118 is reattached to the dispenser 100 and placed in the holder 102 so that the protrusion 122 mates with the indentation 120 and the handle 124 resides in the slot 132. When needed, the user removes the dispenser 100 from the holder 102 by grasping the handle 124 and sliding the dispenser 100 upward and out through the open top 130. The user carries the dispenser 100 by the handle 124 to the location of the divot hole with the spout opening 110 facing generally vertically so that the divot mix does not inadvertently spill. When at the divot hole location, the user tilts the dispenser 100 downwardly with the handle facing upwardly to pour the divot mix from the spout 108. In doing so, the spout opening 110 faces generally away from the divot hole. By shaking the dispenser 100 with the spout opening 110 facing generally away from the divot hole, the fill material is metered from the dispenser 100 into the hole in a controlled and effective manner. When the divot hole is filled as desired, the dispenser 100 may be returned to the holder 102.

The present invention can also be embodied in the form of FIGS. 12-16, which illustrate an alternate embodiment of the divot mix dispenser 200. The divot mix dispenser 200 includes a generally cylindrical body 206 with an upper member 203 removeably coupled with a lower member 205. A spout 208 extends upwardly from the upper member 203. The upper portion of the spout 208 angles away from a longitudinal centerline of the dispenser 200 so that an opening 210 of the spout 208 directs outwardly from the dispenser in a generally horizontal direction. When the dispenser 200 lies in a vertically upright position, such as when it rests in the holder 102, the generally horizontal direction of the opening 210 prevents water from rain or sprinklers from directly entering the spout 208. A lower end of the upper member 203 defines an opening 207 with a threaded inner surface 209 for coupling with the lower member 205 (FIG. 16).

The upper end of the lower member 205 defines an inlet 212 with segmented threads 214 around the outer surface that couple with the threaded upper member 203 (FIG. 13). Similar to FIG. 6, spaces between the thread segments allow divot mix and other debris to pass between the threads 214 and prevent build up of divot mix on the threads 214, which could otherwise inhibit the coupling of the upper member 203. The upper member 203 can be removed to fill the dispenser 200 with divot mix via the inlet 212.

The bottom of the lower member 205 includes a generally annular indentation 220 that mates with a corresponding generally annular protrusion 222 on the holder 102 to reduce unwanted movement of dispenser 200 within the holder 202 while the golf cart is in motion, such as shaking or rattling (FIGS. 2 and 13). Those skilled in the art will recognize that the indentation and corresponding protrusion can be an shape that allows the dispenser 200 to mate with the holder 202, such as oval, square, rectangular, star-shaped and the like.

The divot mix dispenser 200 also includes a handle 224 extending along the body 214. The handle 224 can be either hollow (FIG. 2) or solid (FIG. 13). With the upper member 203 removed, a user engages the handle 224 and uses the dispenser 200 as a scoop to fill the dispenser 200 with divot mix through the inlet 112. Although FIGS. 1-16 show the handle 224 with both ends attached to the body 206, those skilled in the art will recognize that either end of the handle 224 can be detached from the body 206.

At least one baffle 230 is positioned along the interior surface of the body 206 in a generally vertical plane and parallel to the dispenser longitudinal axis. The alternate embodiment of FIGS. 13-14 illustrate three baffles 230 positioned generally equidistant about the interior surface of the body 206. Another baffle 232 is located within the spout 208 opposite the spout opening 210 so that the divot mix flowing from the dispenser 200 can exit through the spout 208 without undue restriction. The baffles 230 and 232 divide and disperse the divot mix in the dispenser 200 to prevent the divot mix from clumping or settling within the dispenser 200. If the divot mix does settle within the dispenser 200, the user shakes the dispenser 200 to impact the divot mix against the baffles 230 and 232 and break it into smaller pieces. This facilitates flow of the divot mix into the spout 208 and out of the opening 210.

Changes can be made in the above constructions without departing from the scope of the invention, it is intended that all matter contained in the above description or shown in the accompanying drawings shall be interpreted as illustrative and not in a limiting sense. For example, the exterior surface of the dispenser 100 can provide an indicia area 300 to display advertising, golf course information, or other personalized information (FIG. 3). The exterior surface of the holder 102 can also provide an indicia area 302 to display advertising, golf course information, or other personalized information (FIG. 1).

Also, a kit including any or all of the aforementioned items may also be provided in various combinations to allow convenient mounting of the holder to the golf cart. The kits may include one or more of the embodiments of the dispenser and the holder described above with any of the associated brackets and/or mounting plates.

What is claimed is:

1. A divot mix system, comprising:
   a divot mix dispenser having an annular body sized to mate with a holder mounted to a golf cart;
   said holder having a base, a sidewall extending upwardly from the base and an opening at a top portion of the holder for receiving the divot mix container, said base having at least one aperture along the base to permit the passage of fluids and debris and a plurality of vertical ribs along an inner surface of the sidewall capable of mating with an outer surface of the divot mix dispenser to define a gap between the inner surface of the holder and the outer surface of the divot mix dispenser for directing the passage of fluids and debris through the aperture in the base;
   a spout located at the upper end of the body, the spout having an opening offset from a centerline of the body through which the divot mix flows out of the dispenser;
   an inlet located at the lower end of the body; said inlet further having segmented threads positioned along the inlet, the segmented threads defining spaces between segmented portions of the segmented threads that prevent the buildup of debris within the threads, and
   a cap removeably attached to the inlet of the body, wherein the cap can be removed from the inlet to fill the dispenser with divot mix and attached to the inlet to secure the divot mix within the dispenser, said cap with an annular protrusion for spacing the dispenser above the base of the holder.

2. The divot mix system of claim 1, said divot mix dispenser further comprising at least one baffle positioned along an interior surface of the body.

3. The divot mix system of claim 1, wherein the cap of the divot mix dispenser includes at least one indentation sized to mate with a corresponding protrusion of the holder to reduce unwanted movement of the dispenser within the holder.

4. The divot mix system of claim 1, said divot mix dispenser further comprising a handle along the body.

5. The divot mix dispenser system of claim 1, wherein the holder further comprises, at least one viewing slot along the sidewall to permit viewing of the level of divot mix material within the divot mix dispenser when the divot mix dispenser is engaged with the holder.

6. The divot mix dispenser system of claim 1, further comprising a bracket attached to the golf cart, the bracket having an attachment plate capable of attaching to at least one holder, the attachment plate being positioned offset from vertical to allow for easier removal of the divot mix dispenser from the holder.

7. The divot mix dispenser of claim 1, wherein the cap includes at least one indentation sized to mate with a corresponding protrusion of the holder to reduce unwanted movement of the dispenser within the holder.

\* \* \* \* \*